April 22, 1969
R. E. DOEDEN ET AL
3,439,422
AIR TOOL
Filed May 22, 1963
Sheet 1 of 2
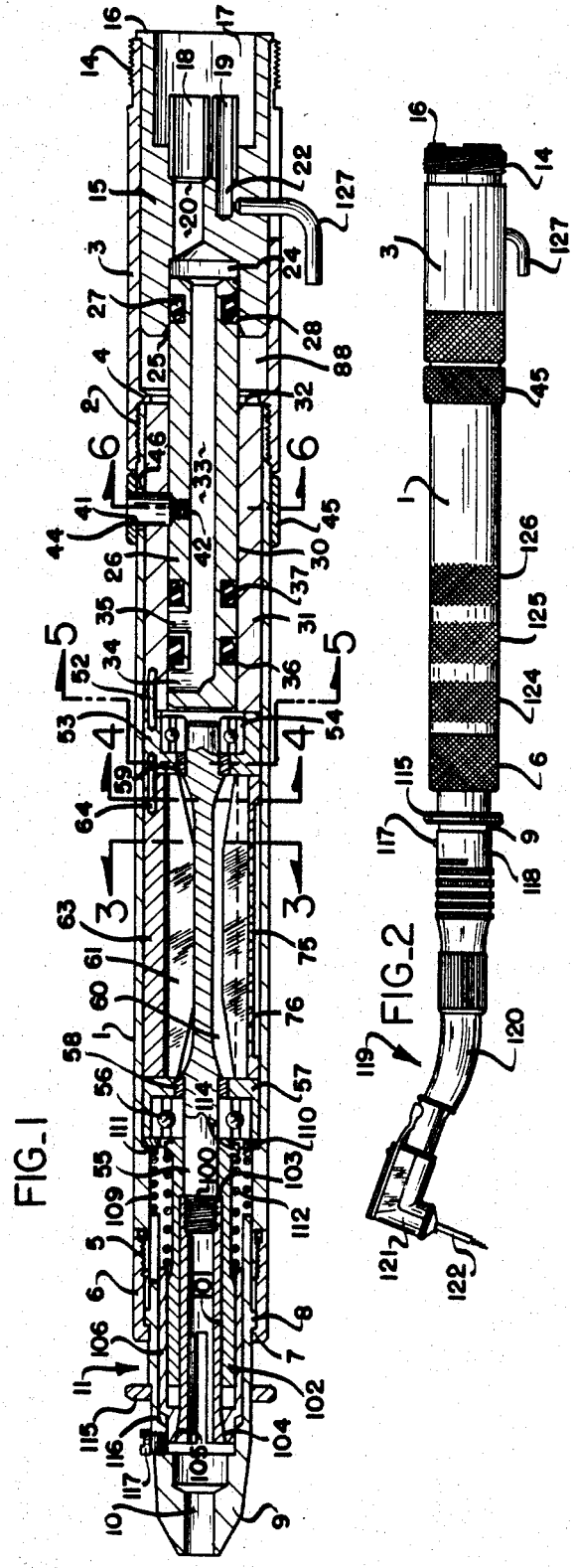
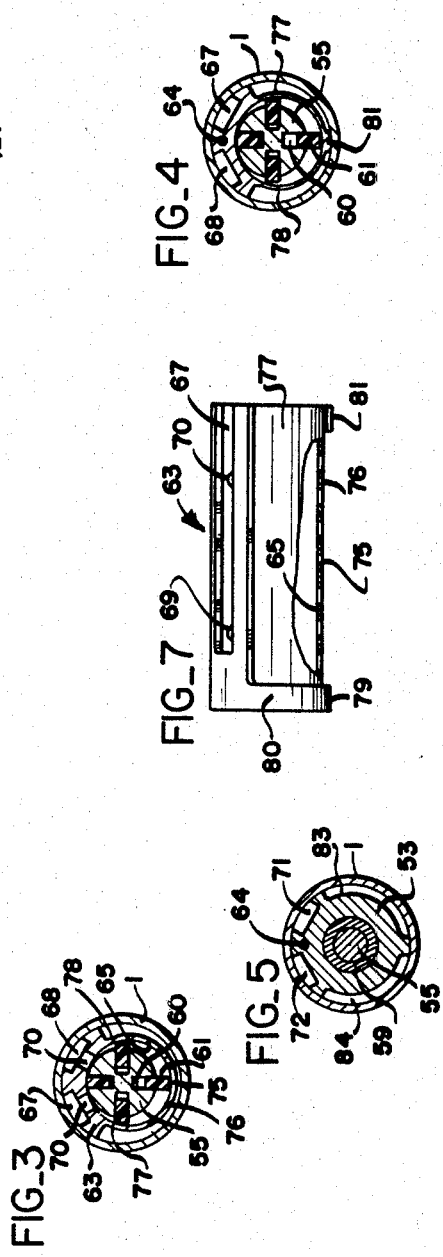
INVENTORS
ROLAND E. DOEDEN
RICHARD E. NOONAN
BY *Oberlin, Maky & Donnelly*
ATTORNEYS

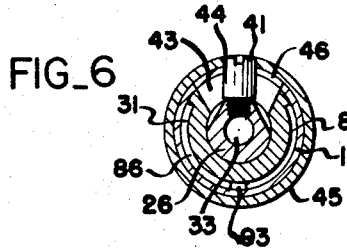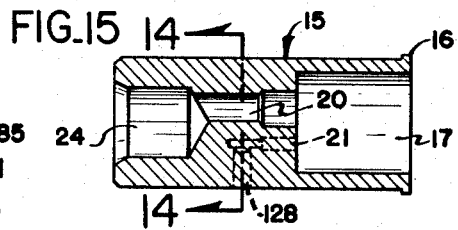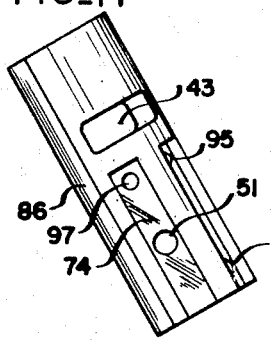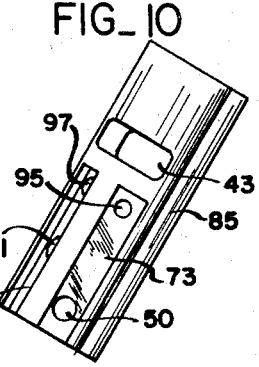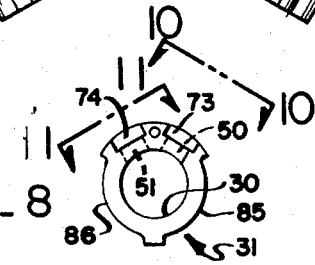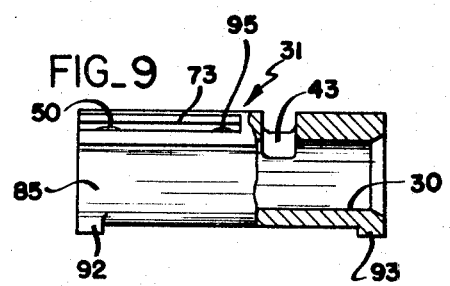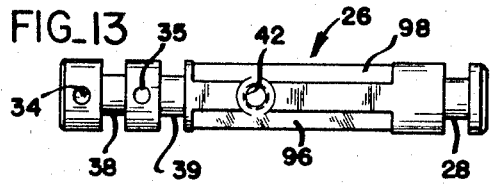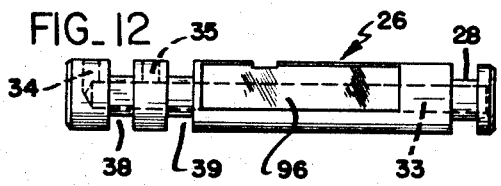

United States Patent Office 3,439,422
Patented Apr. 22, 1969

3,439,422
AIR TOOL
Roland E. Doeden, Ohio Rte. 18, Hicksville, Ohio, 43526, and Richard E. Noonan, R.R. 3, Bryan, Ohio 43506
Filed May 22, 1963, Ser. No. 282,460
Int. Cl. A61c *11/00*
U.S. Cl. 32—27    11 Claims This invention relates generally as indicated to an air tool and more particularly to an air tool especially suited for dental work.

Air turbine dental tools are presently provided which have speeds as high as 340,000 r.p.m. However, such tools are not suitable where lower speeds and high torque is required. For example, in such operations as the cleaning of teeth where considerable pressure is required properly to apply the abrasive material normally employed, the dentist must usually revert to the electric motor and belt driven tools which have speeds of approximately 20,000 r.p.m. In other finishing operations, a higher torque and lower speed tool is required so again the dentist finds use for the more prosaic belt driven tools. Additionally, the belt driven tools can readily be reversed as required for certain dental work. Thus, in order to use the higher speed air driven tool, the dentist must have a source of air pressure from 5 to 35 pounds per square inch and must also have the more conventional electric motor and belt driven tool.

It is accordingly a principal object of the present invention to provide a high torque air driven dental tool which can utilize the same pressures available for the higher speed turbine driven tools.

A further principal object is the provision of a high torque low pressure reversible air tool for dental work and the like which will no longer require the dentist to have both the high speed air tool and the lower speed, higher torque electric tool.

Another object is the provision of a high torque pencil type air tool which can readily be held in the hand.

A further object is the provision of a unique reversing mechanism for such tool.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a double size vertical longitudinal section of an air tool in accordance with the present invention;

FIG. 2 is a side elevation of such air tool in actual size illustrating an angle drive unit connected thereto;

FIG. 3 is a transverse section in the same scale as FIG. 1 taken on the line 3—3 thereof;

FIG. 4 is a similar transverse section taken on the line 4—4 of FIG. 1;

FIG. 5 is a similar transverse section taken on the line 5—5 of FIG. 1;

FIG. 6 is another transverse section through the reversing actuator taken on the line 6—6 of FIG. 1;

FIG. 7 is a side elevation partially broken away and in section of the cylinder surrounding the air motor;

FIG. 8 is an end elevation of the air stem housing;

FIG. 9 is a side elevation of such air stem housing partially broken away and in section;

FIG. 10 is an elevation of such housing as seen from the line 10—10 in FIG. 8;

FIG. 11 is an elevation of such air stem housing as seen from the line 11—11 of FIG. 8;

FIG. 12 is a side elevation of the air stem;

FIG. 13 is a top plan view of the air stem;

FIG. 14 is a transverse section taken on the line 14—14 of FIG. 15 of the spray housing; and FIG. 15 is a longitudinal section of such spray housing.

Referring now more particularly to such drawings and especially to FIG. 1, it will be seen that the tool comprises a cylindrical motor housing 1 externally threaded at its rear end as shown at 2 to receive a cylindrical rear housing 3 of slightly larger diameter. Such rear housing is provided with an inwardly directed abutment flange 4 which engages the end of the housing 1 when the rear housing is properly threaded in place. The forward end of the motor housing 1 is reduced in diameter and externally threaded as indicated at 5 to receive a collar 6 thereon of the same external diameter as the motor housing 1. The collar 6 is provided with an inwardly turned end flange 7 which engages an external stop flange 8 on a nose piece 9 projecting from the forward end of the tool. The nose piece is provided with a central bore 10 to receive the drive shaft of an angle drive unit such as shown in FIG. 2 or the shank of a tool such as a drill, grinder, or polishing instrumentality. The shank of the tool or drive shaft will fit through such bore 10 and into a collet chuck shown generally at 11. The air tool is then housed within the rear housing 3, the motor housing 1, the collar 6 and the nose piece 9.

The rear end of the rear housing 3 is threaded as shown at 14 so that the tool may readily be coupled to the conventional source of air under pressure and water found in dental offices. Mounted in the rear of the rear housing 3 is a spray housing 15 having a rear flange 16 abutting against the rear end face of the rear housing 3. The spray housing 15 is provided with a rearwardly extending enlarged bore 17 into which projects an adapter tube 18 which will be connected to the source of air under pressure and two adapter tubes 19 which can be connected to a source of water or air and water under pressure. The adapter tubes 18 and 19 may be secured in slightly enlarged portions of passages 20, 21 and 22 in the body of the spray housing. The spray housing 15 may be of a material such as brass and the adapter tubes may be secured therein as by brazing.

The main inlet air passageway 20 opens into an enlarged cylindrical bore 24 in the forward end of the spray housing which is disposed concentrically with the spray housing and the rear housing 3. The leading inner edge of the bore 24 may be beveled as indicated at 25 so that the bore will readily receive air stem 26 therein. The air stem 26 fits closely within the bore 24 and is sealed therein by O-ring 27 in annular groove 28 in the end of the air stem.

The forward end of the air stem 26 fits closely within the cylindrical bore 30 of air stem housing 31. The rear end of the bore 30 in the air stem housing 31 is beveled as indicated at 32 to facilitate the insertion of the air stem therein. A central air passage 33 extends through the air stem extending from the bore 24 at the rear of the air stem to two upwardly extending passageways or ports 34 and 35 normal to the axis of the tool. O-rings 36 and 37 in grooves 38 and 39, respectively, on either side of the port 35 are employed to seal the air stem 26 in the bore 30.

The air stem is mounted for rotation within the air stem housing and such rotation is obtained by means of a shoulder screw 41 threaded in tapped opening 42 in the air stem, projecting through arcuate slot 43 in the air stem housing 31 and into a closely fitting circular aperture 44 in knurled selector ring 45 surrounding the housing 1. The arcuate slot 43 in the air stem housing thus permits but limits rotational movement of the air stem with respect to the tool. The operator may then grip the selector ring 45 to rotate the air stem to communicate either of the ports or passages 34 or 35 with the respective porting in the air stem housing 31 to cause the tool to rotate either in a forward or reverse direction. The housing 1 will, of course, be provided with a slot 46 corresponding to the slot 43.

In one position of the air stem, the passageway 34 will communicate with the port 50 in the air stem housing (see FIGS. 8 through 11). In the other position of the air stem, the port or passage 35 will communicate with the port 51 in the air stem housing and the port 34 will be blocked. Thus air pressure from the longitudinally extending bore 33 in the air stem may be selectively directed to the port 51 through port 35 or to the port 50 through the port 34 simply by rotating the air stem by means of the selector ring 45 through a prescribed arc, in the illustrated embodiment, approximately 60°.

The air stem housing 31 is secured against rotation with the air stem by means of a dowel pin 52 extending between the air stem housing 31 and a bearing plate 53. The bearing plate 53 houses a ball bearing 54 supporting the rear end of rotor 55. The forward end of the rotor 55 is supported by ball bearing 56 mounted in bearing plate 57. Spacers 58 and 59 are employed properly longitudinally to center the rotor with respect to such bearings. The rotor 55 between the bearing plates 53 and 57 is radially enlarged and provided with four quadrant spaced radially extending slots 60 accommodating for radial movement fiber plastic vanes 61 which drive the rotor for rotation as hereinafter described.

Surrounding the enlarged portion of the rotor between the bearing plates is a cylinder 63 secured to the bearing plate 53 against rotation by means of dowel pin 64. The cylinder or barrel 63 is provided with a longitudinally extending bore 65, the center of which is directly beneath the axis of the tool so that the bore 65 is thus eccentrically beneath the axis of the rotor 55 and its enlarged portion in which the vanes 61 are mounted. (See FIGS. 3 and 4.)

The top of the cylinder 63 is provided with two longitudinally extending grooves 67 and 68 equally spaced from the vertical plane of and on either side of the cylinder with the centers thereof approximately 60° apart. Each of the grooves 67 and 68 is provided with two ports 69 and 70 which provide air communication between such grooves and the eccentric bore 65 of the cylinder 63 (see FIGS. 3, 4 and 7). The grooves 67 and 68 are axially aligned with grooves 71 and 72, respectively, in bearing plate member 53 (see FIG. 5) and grooves 73 and 74 in air stem housing 31.

It will now be seen that when the air stem 30 is rotated and the port 34 communicates with the port 50 in groove 73 of the air stem housing 31, air pressure will be supplied to the groove 73 which communicates through the groove 71 of the bearing plate 53 with the groove 67 in the cylinder 63 and, of course, through the ports 69 and 70 to the left side of the eccentric air chamber provided by the bore 65 in the cylinder 63. This will cause the vanes to rotate in a counterclockwise direction as viewed in FIG. 3 or a clockwise direction as viewed in FIG. 4. Conversely, if the air stem 30 is rotated by means of the selector ring 45 to communicate the port 35 with the port 51 in groove 74, the port 34 now being blocked, air pressure will be supplied to such groove 74 communicating with the groove 68 through the groove 72 in the bearing plate 53. The air motor will now be caused to rotate in a reverse direction since the air will be supplied on the opposite side of the eccentric bore 63 in the cylinder.

The bottom of the cylinder 63 is provided with a plurality of exhaust openings 75 as seen in FIGS. 1 and 7.

In the illustrated embodiment, such may be seven in number equally longitudinally spaced along the relatively thin bottom wall 76 and approximately .062 inch in diameter. Such exhaust openings 75 are, of course, centered in a plane passing vertically through the axis of the tool so that the pressure entering the eccentric bore 65 from either set of openings 69 and 70 near the top but slightly offset will exhaust through the bottom openings 75. The relatively thin wall 76 of the cylinder is continued on the same center as the bore 65 to provide side relieved portions 77 and 78 shown more clearly in profile in FIGS. 3 and 4. The bottom wall 76 of the cylinder 63 is spaced from the housing 1 by the bottom edge 79 of the forward cylindrical portion 80 of the cylinder 63 and projection 81 at the bottom rear of the cylinder 63.

The exhaust air will then pass from the eccentric bore 65 through the exhaust ports 75 and into the relieved portions 77 and 78 of the cylinder 63 to pass rearwardly through corresponding relieved portions 83 and 84 in the bearing plate member 53 and through likewise corresponding relieved portions 85 and 86 in the air stem housing 31 (see FIG. 8) leading to a muffler chamber 88 between the air stem housing 31 and the spray housing 15. From the muffler chamber 88, the air will exhaust rearwardly through relieved portions 90 and 91 in the spray housing 15 to exhaust rearwardly of the tool. The relieved portions 85 and 86 in the air stem housing 31 may be connected and the air stem housing is then supported on the motor housing 1 by means of projections 92 and 93 at the forward and rear ends of the air stem housing, respectively.

It is apparent that as the blades 61 rotate past the exhaust openings 75, they will trap air in the eccentric bore 65 of the cylinder 63 and this trapped air will be vented to exhaust through the openings 69 and 70 leading from the bore to either of the grooves 67 or 68, depending upon the direction of rotation of the motor. For example, if the rotor 55 is rotating in a counterclockwise direction as viewed in FIG. 4, the trapped air will be forced into the groove 67 which communicates with the relatively short groove 71 in the bearing plate 53 and the groove 73 in the air stem housing 31. In this direction of rotation, the port 50 in the groove 73 will be blocked due to the position of the air stem 26, but the small port 95 at the end of the groove 73 as seen more clearly in FIGS. 9 and 10 will now be vented to the muffler chamber 88 due to the position of flat 96 in the air stem 26. The trapped air in the eccentric bore 65 of the motor will then be forced rearwardly through the grooves 67, 71, 73, and into the port 95, through the flat 96 which provides a passage between the air stem and its housing 31 and into the muffler chamber 88. In this position of the air stem, with the passage 35 aligned with the passage 51 in groove 74, the port 97 at the end of the groove 74 will be blocked by the air stem. However, it will readily be understood that as the air stem is rotated by means of the selector ring 45 to communicate the passage 34 with the port 50 to reverse the direction of rotation of the motor, the port 51 in the groove 74 will become blocked, but the port 97 in the end of the groove 74 will be then in communication with the flat 98 in the air stem to vent the opposite side of the eccentric bore 65 through the grooves 68, 72 and 74 and the flat 98 to the muffler chamber 88.

The forwardly projecting end of the rotor 55 is threaded as indicated at 100 to receive a collet 101 fitted within a slightly enlarged portion of a bore in chuck housing member 102. Such chuck housing member is provided with a shoulder at 103 and the collet may be threaded on the rotor to abut against such shoulder. The collet 101 is provided with outwardly flaring surfaces 104 which cooperate with similarly outwardly flaring surfaces 105 on a collet sleeve 106. A nose spring 109 is interposed between the end of the nose member 9 and a spacer 110 situated between the bearing plate 57 and shoulder 111 on the interior of the motor housing 1. A collet spring 112 is interposed between the end of the collet sleeve and outwardly projecting flange 114 on the rear end of the chuck housing 102. An actuating ring 115 is forced-fitted on the nose piece 9 to permit the same readily to be grasped by the fingers to be retracted for actuation of the chuck. The springs 109 and 112 normally bias the nose piece 9 and the collet sleeve 106 to the left with the surfaces 104 and 105 interacting to close the collet.

When it is desired to remove or insert a tool shank or the drive shaft of an angle drive unit into the chuck, the operator merely grasps the ring 115 and pulls the same to the right (as viewed in FIGS. 1 and 2) against the pressure of spring 109, whereupon the interengaging shoulders 116 between the collet sleeve 106 and the nose 9 engage and the collet sleeve 106 will then also be moved to the right against the pressure of spring 112 to disengage the surface of tapered bore 105 from the tapered outer surfaces of the collet. The collet fingers are then free to spring radially apart for easy withdrawal or insertion of the tool or drive shaft. When the pressure on the ring 115 is released, the spring 109 will move the nose piece outwardly or to the left as seen in FIG. 1 and the spring 112 urges the collet sleeve 106 to the left to engage the surfaces 104 and 105 contracting the fingers of the collet firmly to grip the inserted shank or drive shaft. A projecting screw 117 may be employed as a guide for the insertion of the housing 118 of the angle drive unit 119 as seen in FIG. 2. Such angle drive unit 119, which forms no part of the present invention, comprises a universal joint in the elbow portion 120 driving miter gears in the distal housing 121 with the tool shank 122 projecting therefrom. It has been discovered that by threading the collet 101 directly on the tool rotor 55 as indicated at 100 and especially against the stop shoulder 103 in the chuck housing 102, run-out can be held to a minimum. In any event, the tool shank or drive shaft can readily be inserted in the air tool simply by retracting the ring 115 to open the collet for insertion of the shank or shaft and releasing the same so that the collet fingers will readily grip the inserted shank or shaft.

As seen in FIG. 2, the exterior of the motor housing 1 may be provided with three distinct knurled portions 124, 125 and 126 and the collar 6 may also be knurled to facilitate the gripping of the tool by the operator. The selector ring 145 is preferably also knurled to facilitate the selective turning thereof to control the direction of rotation of the tool. Two elbow tubes 127 are provided projecting from the spray housing 15 and such may be secured in apertures 128 and 129 seen in FIG. 14. Tubes may be connected to these elbows to spray water or other desired coolant as well as air into the work area and such tubes may be clipped in the conventional manner either to the angle drive unit or to the nose piece 9 of the tool.

Reviewing briefly the flow of air for the illustrated embodiment, air enters through the adapter tube 18 in the spray housing 15 and passes from the bore 20 into the bore 33 of the air stem 26. The air stem bridges the spray housing 15 and the air stem housing 31. From the bore 33, the air will pass either through passage 34 or 35 depending upon the selected position of the air stem into either the groove 74 or 73 of the air stem housing. If the selector ring 45 is rotated to the right hand side of the tool facing the work, air will pass through the passage 35 and the port 51 into the groove 74. Air will then pass along the groove 74 through the groove 72 in the bearing plate 53 which is aligned therewith and into the groove 68 of the cylinder 63. Air will then enter the eccentric bore 65 of the cylinder to cause the rotor to rotate in a counterclockwise direction as viewed in FIG. 4. Air trapped in the bore 65 by the blades 61 will pass through the apertures 69 and 70 in groove 67, and then through the aligned grooves 67, 71 and 73 to pass through port 95 in the end of groove 73 and through the passage formed by the flat 96 and the bore 30 of the air stem housing 31 to enter the muffler chamber 88. The main exhaust will pass through the apertures 75 in the bottom wall 76 of the cylinder 63 and flow through the relieved portions 77 and 78 in the cylinder and the aligned relieved portions 83 and 84 in the bearing plate assembly 53 to pass into the relieved portions 85 and 86 in the air stem housing to enter the muffler chamber 88.

If the selector ring is rotated to the left hand side of the tool facing the workpiece, the passage 34 of the air stem will be in communication with the port 50 in the groove 73 as seen in FIG. 10. The passage 35 will then direct air to the groove 73 to pass through the aligned groove in the bearing plate assembly 53 and into the groove 67 to enter the cylindrical bore 65 of the cylinder 63 through the ports 69 and 70 to rotate the rotor 55 in a clockwise direction as viewed in FIG. 4. Air trapped within the bore 65 by the blades 61 will exhaust through the ports on the opposite side of the bore into the groove 68 and then back along the outside of the cylinder through the aligned groove in the bearing plate assembly 53 and into the groove 74 to be exhausted into port 97 to pass through the passage created by the flat 98 of the air stem within the air stem housing to enter the muffler chamber 88. Again, the main exhaust will pass from the cylindrical bore 65 through the exhaust ports 75 into the relieved portions 77 and 78 to flow back along the tool through the aligned relieved portions 83 and 84 in the bearing plate member 53 and the relieved portions 85 and 86 in the air stem housing 31 to enter the muffler chamber 88.

It can now be seen that there is provided a compact air tool especially suitable for dental purposes which will be able to provide high torque at low pressures such as 5 to 35 pounds per square inch. The speeds of the tool may vary from 5,000 to 30,000 r.p.m. at such pressures. Moreover, with applicant's unique valving and porting mechanism, a vane-type motor providing such high torque can be rotated in either direction.

Other modes of applying the principle of the invention may be employed, change being made as regards the details described, provided the features stated in any of the following claims or the equivalent of such be employed.

We, therefore, particularly point out and distinctly claim as our invention:

1. An air tool comprising an elongated cylindrical housing, a vane-type air motor in said housing, said air motor including a rotor extending axially of said housing and radially extending vanes mounted in said rotor, said rotor being confined within an eccentric bore, means operative to secure a tool or the like to said rotor, a selector ring rotatably mounted on said housing, air stem means mounted coaxially in said housing and connected to said selector ring for rotation therewith, means communicating the interior of said stem means with a source of air under pressure, and passage means interconnecting the interior of said stem means and said eccentric bore for supplying air under pressure to said eccentric bore selectively on opposite sides of a plane passing through the center of said rotor and bore to selectively change the direction of rotation of said motor.

2. An air tool as set forth in claim 1 further including an air stem housing surrounding said air stem means, said passage means including port means in said air stem housing communicating with said air motor to reverse the direction thereof depending upon the selected position of rotation of said air stem.

3. An air tool as set forth in claim 2 wherein said port means comprise circumferentially spaced elongated grooves communicating with said air motor, air pressure supplied to the selected one of said grooves by rotation of said air stem driving said motor in the selected direction of rotation.

4. An air tool as set forth in claim 3 further including means to vent the non-selected groove to exhaust through said air stem housing.

5. An air tool as set forth in claim 1 further including a chuck collet threaded on said rotor, a chuck housing surrounding said rotor and collet and having a shoulder engaging said collet, and means operative to expand and contract said collet to connect a tool shank and the like to said rotor.

6. An air tool comprising an elongated cylindrical housing, a vane-type air motor in said housing including an axially projecting rotor, a chuck collet secured to said rotor, means operative to expand and contract said collet to connect a tool shank and the like to said rotor, two air passages leading to said motor, valve means in said housing operative to pressurize one of said passages while venting the other to rotate said motor in a selected direction of rotation, said valve means comprising an air stem axially mounted in said housing, an air stem housing surrounding said air stem, an axial air inlet in said air stem, and means responsive to rotation of said air stem to communicate said axial air inlet with the selected one of said air passages.

7. An air tool as set forth in claim 6 wherein said chuck collet is threaded on said rotor, a chuck housing surrounding said collet, and a shoulder in said housing engaging said collet firmly to seat and secure said collet to said rotor.

8. An air tool comprising an elongated cylindrical housing, a vane-type air motor in said housing of the type including radially extending vanes mounted in a rotor extending axially of said housing, said vanes being confined within an eccentric bore, a cylinder surrounding said bore, means to connect a tool to said rotor, a selector ring surrounding said housing, means responsive to the rotation of said selector ring to supply air under pressure to said eccentric bore to rotate said vanes and thus said rotor in a selected direction of rotation, an air stem axially mounted in said housing, means connecting said selector ring and air stem for rotation as a unit, an air stem housing surrounding said air stem, two sets of air passages connecting said air stem housing and the eccentric bore for said motor, means responsive to the rotation of said air stem about the axis of said housing to connect one of said passages to air under pressure and to vent the other of said passages, exhaust passages in said eccentric bore, channel means in said air stem housing operative to communicate said exhaust passages to a muffler chamber, and means in said air stem operative to vent either of said passages also to said muffler chamber.

9. An air tool comprising an elongated cylindrical housing, a vane-type air motor in said housing of the type including radially extending vanes mounted in a rotor extending axially of said housing, said vanes being confined within an eccentric bore, a cylinder surrounding said bore, means to connect a tool to said rotor, a selector ring surrounding said housing, means responsive to the rotation of said selector ring to supply air under pressure to said eccentric bore to rotate said vanes and thus said rotor in a selected direction of rotation, an air stem axially mounted in said housing, means connecting said selector ring and air stem for rotation as a unit, an air stem housing surrounding said air stem, two sets of air passages connecting said air stem housing and the eccentric bore for said motor, means responsive to the rotation of said air stem about the axis of said housing to connect one of said passages to air under pressure and to vent the other of said passages, exhaust passages in said eccentric bore, channel means in said air stem housing operative to communicate said exhaust passages to a muffler chamber, and means in said air stem operative to vent either of said passages also to said muffler chamber, said air stem including a coaxially longitudinally extending bore and two axially spaced passages normal thereto, rotation of said air stem communicating one of said normal passages with a selected one of said passages leading to said air motor and venting the other to said muffler chamber.

10. An air tool comprising an elongated cylindrical housing, a vane-type air motor in said housing including an axially projecting rotor, a chuck collet secured to said rotor, means operative to expand and contract said collet to connect a tool shank and the like to said rotor, two air passages leading to said motor, valve means in said housing operative to pressurize one of said passages while venting the other to rotate said motor in a selected direction of rotation, said valve means comprising an air stem axially mounted in said housing, an air stem housing surrounding said air stem, an axial air inlet in said air stem, means responsive to rotation of said air stem to communicate said axial air inlet with the selected one of said air passages, said motor comprising a plurality of radially projecting vanes in said rotor, an eccentric cylinder surrounding said vanes, exhaust ports in said cylinder, and means to communicate said exhaust ports with a muffler chamber through said air stem housing.

11. An air tool comprising an elongated cylindrical housing, a vane-type air motor in said housing including an axially projecting rotor, a chuck collet secured to said rotor, means operative to expand and contract said collet to connect a tool shank and the like to said rotor, two air passages leading to said motor, valve means in said housing operative to pressurize one of said passages while venting the other to rotate said motor in a selected direction of rotation, said valve means comprising an air stem axially mounted in said housing, an air stem housing surrounding said air stem, an axial air inlet in said air stem, means responsive to rotation of said air stem to communicate said axial air inlet with the selected one of said air passages, said motor comprising a plurality of radially projecting vanes in said rotor, an eccentric cylinder surrounding said vanes, exhaust ports in said cylinder, means to communicate said exhaust ports with a muffler chamber through said air stem housing, a bearing assembly supporting one end of said rotor between said cylinder and said air stem housing, and air passage means in said assembly providing air communication between said air stem housing and cylinder.

References Cited

UNITED STATES PATENTS

| 2,666,259 | 1/1954 | Thau-Jensen | 32—26 |
| 691,740 | 1/1902 | Birkenstock | 253—2 |
| 2,251,057 | 7/1941 | Iseman. | |
| 2,423,957 | 7/1949 | Amsberg | 91—121 XR |
| 2,715,889 | 8/1955 | Sturrock | 91—121 XR |

ROBERT PESHOCK, *Primary Examiner.*

U.S. Cl. X.R.

91—121; 253—2